United States Patent
Bates et al.

(10) Patent No.: US 6,680,551 B2
(45) Date of Patent: Jan. 20, 2004

(54) ELECTRIC MOTOR MUFFLER

(75) Inventors: Roy Bates, Glen Allen, VA (US); John Robert Bohannon, Richmond, VA (US); Brian Williamson, Richmond, VA (US)

(73) Assignee: Hamilton Beach/Proctor-Silex, Glen Allen, VA (US)

( * ) Notice: Subject to any disclaimer, the term of this patent is extended or adjusted under 35 U.S.C. 154(b) by 45 days.

(21) Appl. No.: 09/931,921

(22) Filed: Aug. 20, 2001

(65) Prior Publication Data

US 2003/0042805 A1 Mar. 6, 2003

(51) Int. Cl.[7] .................................................. H02K 9/00
(52) U.S. Cl. ............................. 310/62; 310/58; 310/59
(58) Field of Search ............................... 310/62, 53, 58, 310/59, 63, 89, 52

(56) References Cited

U.S. PATENT DOCUMENTS

| | | |
|---|---|---|
| 2,157,609 A | 5/1939 | Hopkins |
| 2,822,485 A | 2/1958 | Braun et al. |
| 2,886,721 A | 5/1959 | Picozzi et al. |
| 3,493,214 A | 2/1970 | Edwards et al. |
| 3,548,280 A | 12/1970 | Cockroft |
| 3,575,524 A | 4/1971 | Adajian |
| 3,748,507 A * | 7/1973 | Sieber ........................ 310/52 |
| 3,749,953 A * | 7/1973 | Baumann et al. .............. 310/62 |
| 3,866,263 A | 2/1975 | Crouser et al. |
| 3,895,761 A | 7/1975 | Mills |
| 3,901,349 A | 8/1975 | DeNoyer |
| 3,901,484 A | 8/1975 | Ernster |
| 3,930,558 A | 1/1976 | Schnell et al. |
| 4,071,789 A | 1/1978 | Ernster et al. |
| 4,132,912 A | 1/1979 | Wright |
| 4,150,313 A | 4/1979 | Panza |
| 4,305,670 A | 12/1981 | Moskowitz et al. |
| 4,783,173 A | 11/1988 | Artin |
| 5,084,641 A | 1/1992 | Saima et al. |
| 5,124,600 A | 6/1992 | Hedeen |
| 5,183,975 A | 2/1993 | Craggs et al. |
| 5,236,135 A | 8/1993 | Wilson et al. |
| 5,244,275 A | 9/1993 | Bauer et al. |
| 5,273,358 A | 12/1993 | Byrne et al. |
| 5,321,581 A | 6/1994 | Bartilson et al. |
| 5,417,152 A | 5/1995 | Harrison |
| 5,432,306 A | 7/1995 | Pfordresher |
| 5,614,774 A | 3/1997 | McCallops et al. |
| 5,696,358 A | 12/1997 | Pfordresher |
| 5,765,257 A | 6/1998 | Steger et al. |
| 5,852,968 A | 12/1998 | Sundquist |
| 5,866,959 A | 2/1999 | Le Flem |
| 5,883,451 A | 3/1999 | Majchrzak et al. |
| 5,983,888 A | 11/1999 | Anselmino et al. |
| 6,069,423 A | 5/2000 | Miller et al. |
| 6,131,696 A | 10/2000 | Esslinger |

\* cited by examiner

Primary Examiner—Thanh Lam
(74) Attorney, Agent, or Firm—John H. Thomas, P.C.

(57) ABSTRACT

A muffler is incorporated into an electric motor housing to increase air flow across the motor and to reduce noise escaping from the housing. The muffler includes a cone adapted to be mounted adjacent the exhaust side of the motor fan. The muffler further includes an exhaust passageway comprising at least 270° in turns before final exhaustion.

11 Claims, 5 Drawing Sheets

ELECTRIC MOTOR MUFFLER

This invention relates to a motor housing assembly including an air exhaust cone for creating laminar air flow, and including an air exhaust passageway for reducing noise created by the operation of the motor.

BACKGROUND OF THE INVENTION

Electric motors and appliances are most often cooled by an integral fan that blows air on or draws air over the motor during operation. Unfortunately, many of the cooling systems are inefficient, because air flow through the motor housing and across the motor is turbulent and, as a result, inefficient. The inefficiency may result in reduced cooling. Poor intake and exhaust air flow can cause overheating of a motor.

In addition to cooling the motor, the inefficient air flow and fan operation creates noise. An inefficient air flow particularly can create a substantial noise level. If an engineer tries to compensate for the poor cooling of a motor with a more powerful fan, then the result is to create even more noise.

It is known to try to increase air flow across the motor by diffusing exhaust air. In other words, the exhaust outlet is larger than the air inlet. Despite this design feature, turbulence of air flow still prevents a fan from being as efficient as possible.

Diffusing the exhaust air also reduces noise by slowing down the air flow. Another known method of trying to damp the noise from a motor is to use a sound absorbent material in an exhaust path. While sound absorbent material has some effect in reducing noise, it is not always practical to use, because it can make the exhaust path tighter, and therefore the air flow less efficient.

SUMMARY OF THE INVENTION

Accordingly, it is a feature of the present invention to solve the foregoing problems and provide a motor housing assembly that reduces noise and that also creates a more efficient air flow. The result is a more efficient cooling system that creates less noise than conventional electric motor housings.

In one embodiment, the invention includes a motor housing assembly adapted to contain a motor wherein the motor comprises a fan adapted to cool the motor by drawing air across it. The assembly comprises an air inlet port, a shroud to contain the motor within the housing and an air inlet passageway defining a path from the inlet port to the motor. The assembly further comprises an air outlet port and an air outlet passageway separated from the inlet passageway and defining a path from the motor to the outlet port. The assembly also comprises a cone mounted in the outlet passageway and adjacent the fan whereby air that is exhausted by the fan will flow in a laminar fashion around the cone and through the outlet passageway and outlet port. The cone may have a frusco-conical shape comprising a circular base, a circular top and a sidewall wherein the sidewall has a vertical cross-section with a convex curve. Still further, the inlet port and outlet port have cross-sectional areas that are substantially equal. The fan may comprise a central hub portion having a circular face, and the circular face may have substantially the same cross-sectional area as the circular top of the cone. Also, the diameter of the fan may be larger than the diameter of the circular base of the cone.

In another embodiment, the motor housing assembly is adapted to hold a motor wherein the motor comprises a fan adapted to cool the motor by drawing air across it. The assembly comprises an air outlet port and an air outlet passageway defining a path from the fan to the outlet port wherein the outlet passageway comprises a plurality of turns totaling at least 270° of direction change. The outlet passageway may further comprise walls padded with a sound-absorbing material. The passageway may comprise three different turns of at least 90° each.

DETAILED DESCRIPTION OF THE PREFERRED EMBODIMENTS

As will be described in detail herein, the handling of the air flow through the motor housing can be improved to both increase cooling effect and reduce noise. The variations of the present invention are adaptable to many existing motor assemblies. Accordingly, the specific structure disclosed should not and is not a reasonable limitation of the scope of the present invention.

Figure 1:
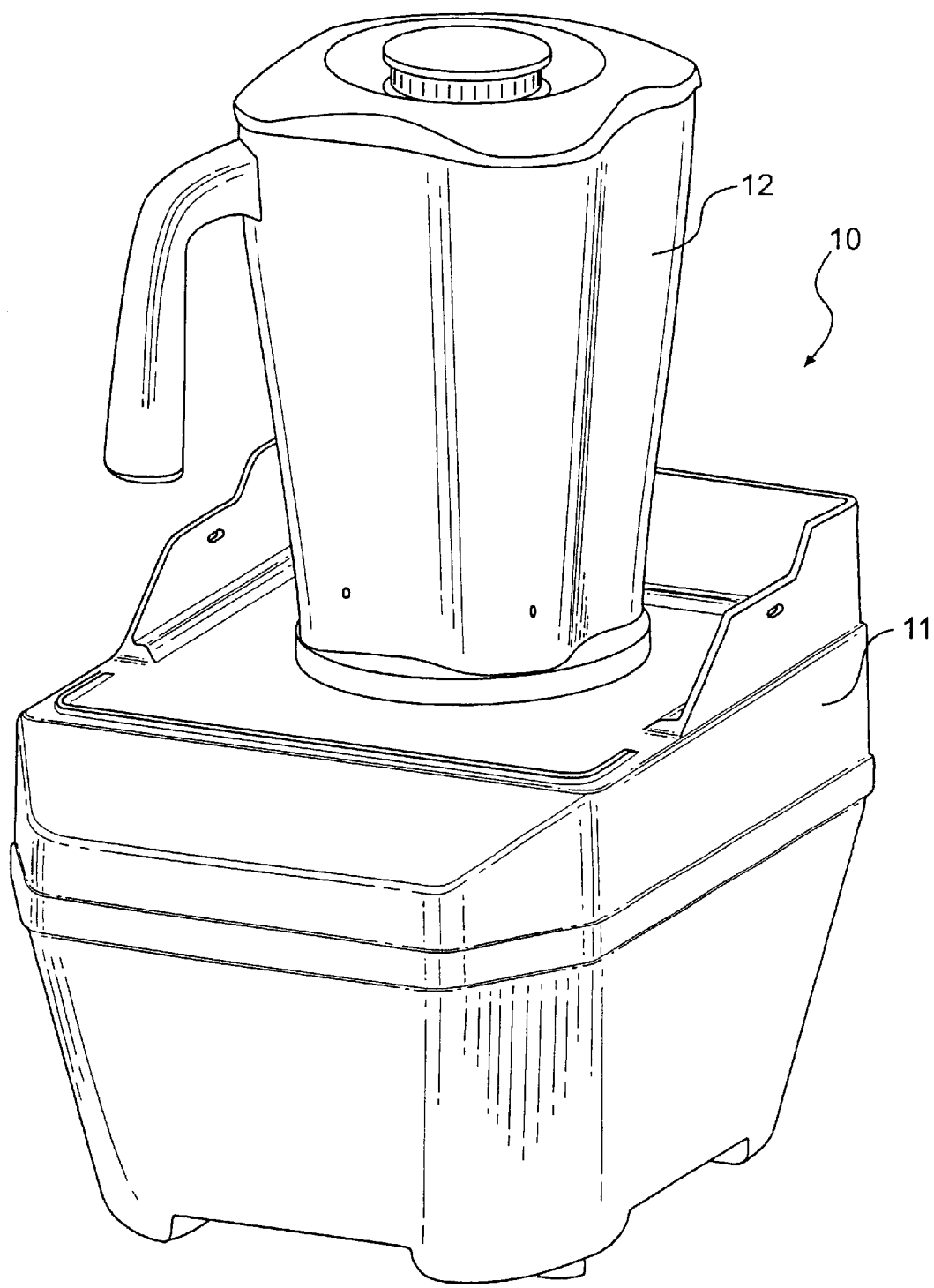
FIG. 1 is a perspective view of a blender housing that contains the present invention.

Turning first to FIG. 1, there is shown a blender 10 having a blender jar 12 mounted onto the blender motor housing 11. The preferred embodiment described herein relates to a blender motor and blender housing apparatus, but the teachings may be applied to many different types of appliances that have electric motors that need to be cooled during operation.

Figure 2:
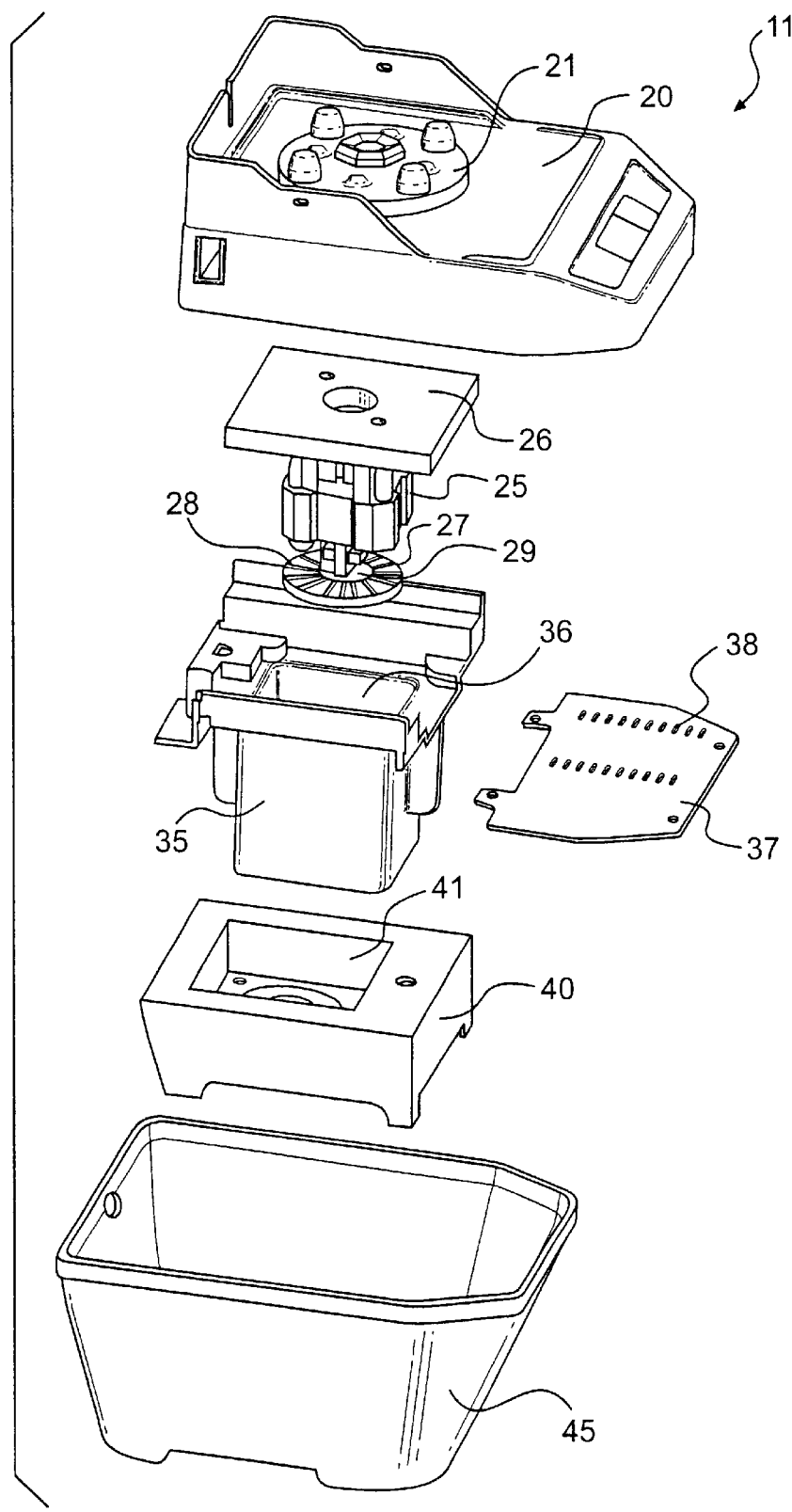
FIG. 2 is a perspective, exploded view of the motor housing assembly in accordance with the present invention.

FIG. 2 is an exploded view of a motor housing assembly 11 that, as can be seen in FIG. 1, is a blender base in this example. The assembly 11 includes a top plate 20 onto which a blender jar pad 21 is bonded. The top plate 20 of the housing is attached to the base 45 of the housing to enclose the components inside the housing. A motor mounting plate 26 is fixed to the underside of the top plate 20. The mounting plate 26 carries the motor 25. Mounted on the bottom of the motor 25 is a fan 27. The fan 27 includes fan blades 28 and a central hub portion 29. When the motor 25 is on, the fan blades 28 draw air across the motor by exhausting air downwardly. A motor shroud 35 is similarly connected to the bottom of the top plate 20. The shroud 35 includes a recess 36 into which is received the motor 25. The recess 36 in the shroud 35 is a generally rectangular column that is open at the top and at the bottom. A metal plate 37 having screen apertures 38 is similarly attached to the bottom of the top plate 20. Mounted in the base 45 is a muffler 40 having a recess 41 adapted to receive the bottom of the shroud 35.

Figure 3:
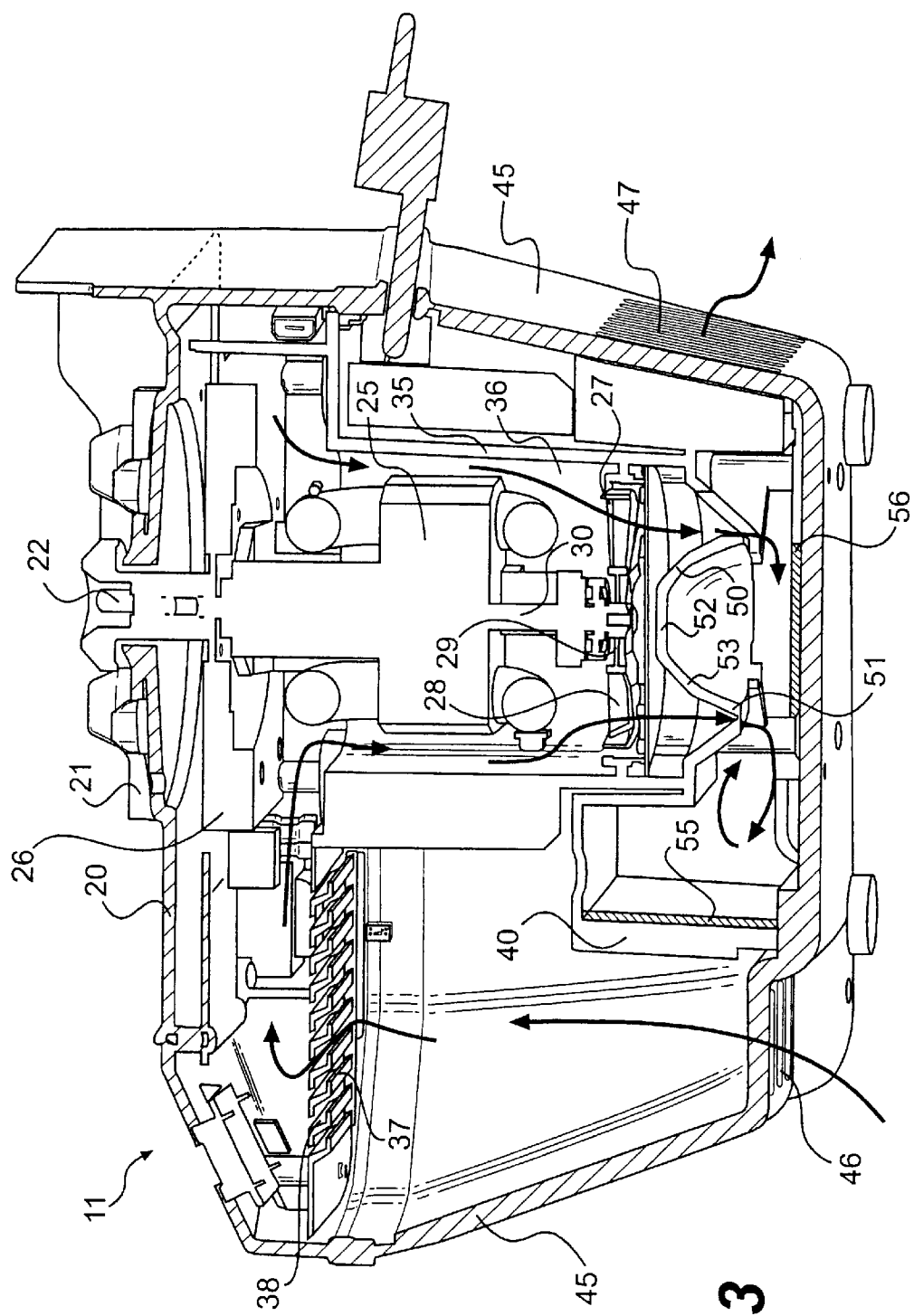
FIG. 3 is a cross-sectional, side view of a motor housing assembly in accordance with the present invention.

FIG. 3 shows still further detail of the housing assembly 11. As can be seen, the base 45 has two sets of apertures 46 and 47. The apertures 46 are an inlet port allowing air to flow into the inside of the assembly 11. The apertures 47 are the outlet port through which air is exhausted from inside the housing assembly 11. As can be seen by following the arrows in FIG. 3, air is drawn in through the inlet port apertures 46. The air passes through the screen apertures 38 through to the top of the motor 25 (actually, to the top of the recess 36 in which the motor is mounted). The fan 27 then draws the air across the motor and pushes the air out through the muffler 40 and out the outlet port apertures 47. As illustrated, the air that is forced by the fan 27 into the muffler 40 is sealed from the rest of the inside of the housing assembly 11. By this way, the air that is exhausted by the fan 27 is not recirculated around the motor 25. Instead, fresh air enters through the inlet ports 46 to circulate around the motor 25.

Figure 4:
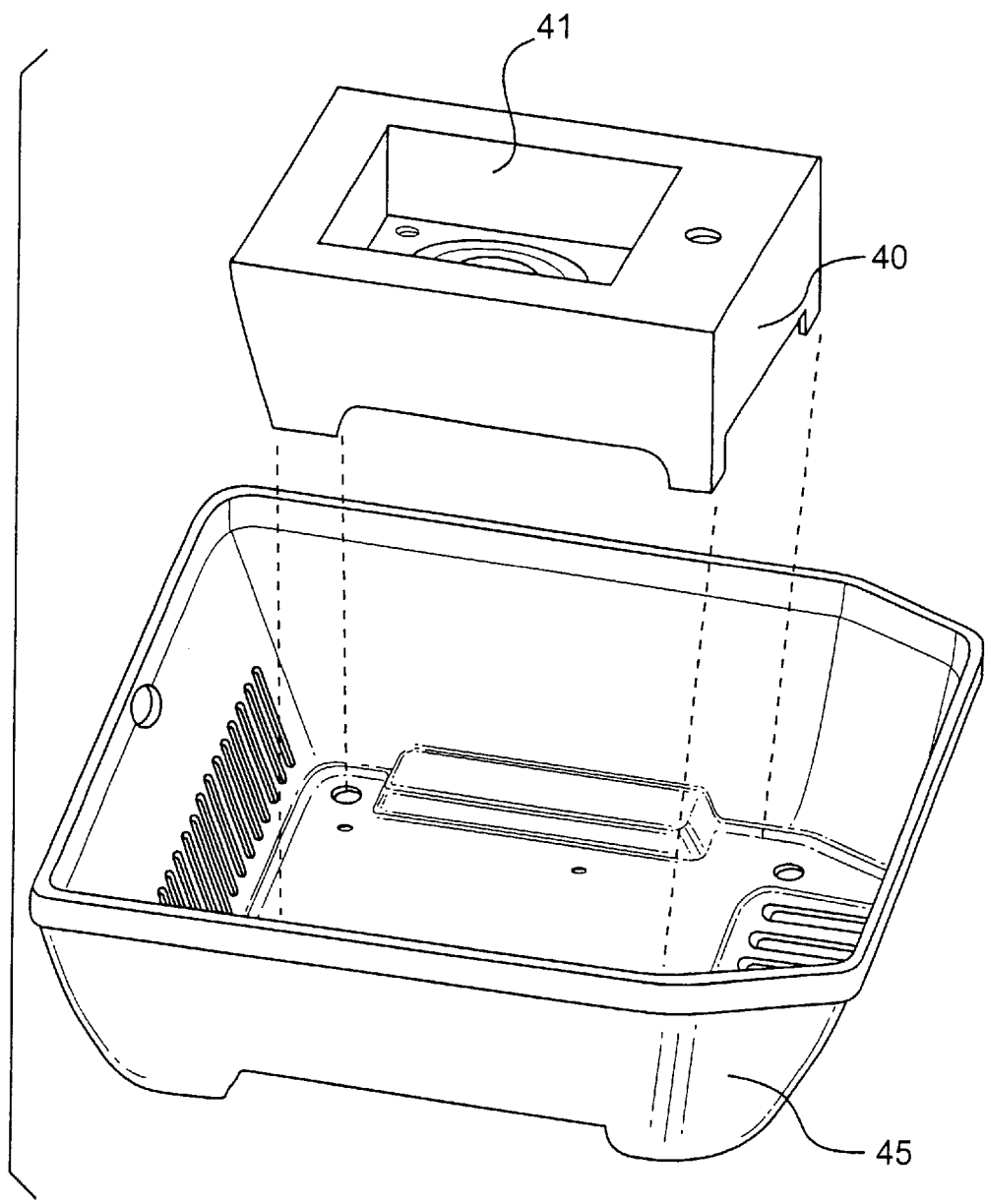
FIG. 4 is a perspective, exploded view of the motor housing base and muffler in accordance with the present invention.

FIG. 4 shows with more specificity how the muffler 40 seals against the bottom of the base 45 so that when the motor shroud 35 is received within the muffler 40, the air that is exhausted by the fan 27 is sealed by the muffler from the rest of the inside of the housing 11. The bottom edge 44 of the muffler 40 is contoured to match the bottom of the base 45. The back edge 42 of the muffler seals against the back wall 43 of the base 45. As a result, the muffler 40, when mounted in the base 45, defines the specific path that the exhaust air will follow when being forced out of the housing 11. A sound absorbent patch 56 is adhered to the bottom of the base 45 to assist in the noise mitigation.

Figure 5A:
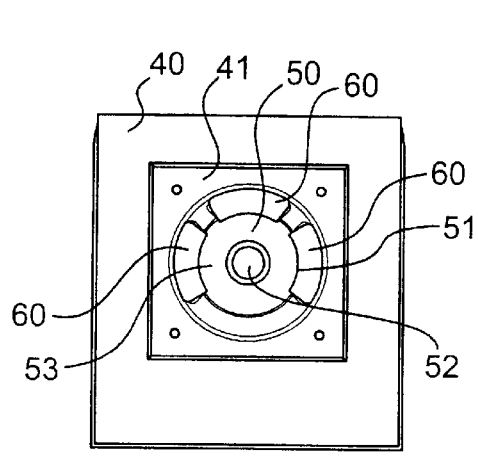
FIGS. 5A and 5B are top plan and cross-sectional, top plan views respectively of the muffler in accordance with the present invention.
Figure 5B:
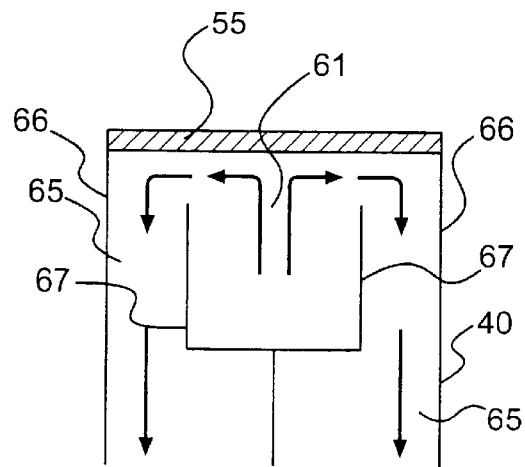
Figure 6:
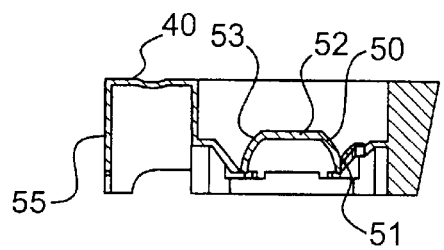
FIGS. 6 and 7 are alternative embodiments of cones that comprise part of the present invention.
Figure 7:
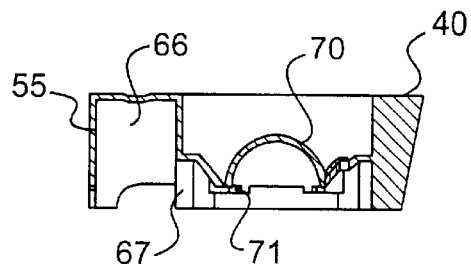

Turning now to FIGS. 5A, 5B and 6, there is shown more detail with respect to the muffler 40. Mounted in the bottom of the recess 41 is a cone 50. The cone 50 is adapted to be adjacent to and centered with the fan 27 that is attached to the motor 25 that is mounted within the recess. The cone 50 has a frusco-conical shape in that it has a circular base 51 and a flat, circular top 52. The sidewall 53 has a convex cross-section. The diameter of the flat top portion 52 is substantially the same as the diameter of the hub portion 29 of the adjacent fan 27. In this way, the air that is exhausted by the fan blades 28 will be pushed around the side walls 53 of the cone 50. The shape of the walls 53 of the cone 50 are engineered to create a laminar flow of the air forced downward by the fan blades 28. The position of the cone 50 substantially eliminates the opportunity for the air exhausted by the fan 27 to eddy in an inefficient manner. By creating this laminar air flow off of the fan 27, the air moves more quickly and efficiently through the muffler 40. The specific shape of the cone 50 will depend on multiple factors. FIG. 7, for instance, illustrates a more bullet-point shape or hemispherical shape cone 70 that could be more appropriate for a fan having longer blades and less of a hub. Still further, the size of the blades, the rpm of the fan, and the pitch of the blades are all factors that will contribute to an engineers specific decision as to the shape of the cone to be mounted adjacent the exhaust/outlet side of a fan.

FIG. 5B illustrates a cross-section of the muffler detailing the air flow through the muffler 40. Immediately after exiting the fan, the air is turned 90° in order to convert it from a perpendicular air flow from the exhaust of the fan 27 into the horizontal air flow that is depicted in FIG. 5B. As shown, one wall 55 of the muffler has sound absorbent material adhered along its length. The inside of the muffler 40 further includes a three-sided box chamber 61 defined by walls 67. The parallel outside walls 66, together with walls 67, form a channel 65. The entire path of the air across the cone 50 into the chamber 61 and out the channels 65 comprise together the exhaust passageway of the air from the motor. As can be seen, the air is turned effectively three times. There is turn from the perpendicular direction to the horizontal plane—a first 90° turn. The air is then looped around in a horseshoe fashion (180°) from the exhaust chamber 61 into and out of the channel 65 through an outlet port 47. The exhaust passageway, therefore, turns the air and noise from the motor three times for at least a 270° change as defined by the walls 66 and 67 of the exhauset passageway. This turning of the air and noise is important in the reduction of the noise that is heard outside the housing. In other words, while there is a reduction of noise as a result of the laminar air flow prompted by the cone 50, there is further reduction of noise from the motor as result of the outlet passageway turning at least 270°.

The cross-sectional area of the air inlet 46 is substantially equal to the inlet screen apertures 38 and the exhaust port 47. It is also substantially the same cross-sectional area as the combination of the cross-sectional areas of the apertures 60 that allow flow of air around the base of the cone 50. There are efficiencies obtained by maintaining substantially the same cross-sectional area through the air flow into the housing, across the motor, and out the outlet. By minimizing variations in the exhaust path, for instance, there is efficient outlet flow of the air. In other words, if the air is allowed to diffuse too much into a substantially larger passage, then the efficiency of the air flow can be reduced.

The following examples demonstrate the increased air flow as a result of the cone and the reduced noise is a result of the laminar air flow and the turns in the exhaust passageway.

EXAMPLE

A series of tests were run to determine the level of air flow efficiencies and noise mitigation as a result of using the muffler shown in FIGS. 2 through 6. First, a motor mounted in a currently-offered Hamilton Beach blender (Model No. 91500 was used. The motor used is virtually the same motor as illustrated in the drawings herein. The motor was mounted onto a chamber that is sealed and has only one exit onto which was mounted a flow rate meter. In test one, the motor alone with no muffler components was mounted on the chamber. In the second test, the cone component of the muffler was mounted adjacent the exhaust side of the motor fan. In the third test, the motor was mounted together with a muffler containing both the cone and the exhaust passageway features as shown in the attached figures. Three trials were done with each variable test. As can be seen, the air flow was increased by using the cone mounted next to the exhaust side of the fan. This increase in flow rate was even obtained with the inclusion of the defined exhaust passageway.

| Test | Air Flow Rate | |
| --- | --- | --- |
| | Trials | Flow Rate cf/m |
| 1. 91500 motor | 1 | 33.68 |
| no muffler | 2 | 33.51 |
| | 3 | 33.51 |
| 2. 91500 motor | 1 | 41.19 |
| w/ cone | 2 | 41.36 |
| no exhaust passageway | 3 | 41.02 |
| 3. 91500 motor | 1 | 35.69 |
| w/ cone and | 2 | 35.95 |
| exhaust passageway as shown | 3 | 35.69 |

The muffler described herein and shown in FIGS. 2 through 6 was next tested to determine the mitigation of the noise level as a result of using the muffler. Two tests were run. The first test included the measurement with a sound meter of the noise created by the motor exhaust (same motor as earlier tests herein) alone with no muffler. The second test included the use of the muffler as described in detail herein with both the cone and outlet/exhaust passageway. The following table sets forth the results of these tests. The reduction in sound through use of the muffler is significant.

Noise Mitigation

| Test | Trials | db |
| --- | --- | --- |
| 1. 91500 motor | 1 | 92.5 |
| no muffler | 2 | 92.5 |
|  | 3 | 92.5 |
| 2. 91500 | 1 | 85.5 |
| w/ cone and exhaust | 2 | 85.5 |
| passageway, as shown | 3 | 85.5 |

While the invention has been described with reference to specific embodiments thereof, it will be understood that numerous variations, modifications and additional embodiments are possible, and accordingly, all such variations, modifications, and embodiments are to be regarded as being within the spirit and scope of the invention.

What is claimed is:

1. A motor housing assembly adapted to contain a motor wherein the motor comprises a fan adapted to cool the motor by drawing air across it, the assembly comprising:

an air inlet port, a shroud to contain the motor within the housing, an air inlet passageway defining a path from the inlet port to the motor, an air outlet port, an air outlet passageway separated from the inlet passageway and defining a path from the motor to the outlet port, and a cone mounted in the outlet passageway and adjacent the fan, whereby air that is exhausted by the fan will flow in a laminar fashion around the cone and through the outlet passageway and outlet port.

2. A motor housing assembly as described in claim 1, wherein the cone has a frusco-conical shape comprising a circular base, a circular top and a side wall, further wherein the side wall of the cone has a vertical cross-section with a convex curve.

3. A motor housing assembly as described in claim 2, wherein the fan comprises a central hub portion having a circular face and the circular face has substantially the same cross-sectional area a the circular top of the cone.

4. A motor housing assembly as described in claim 2, wherein the diameter of the fan is larger than the diameter of the circular base of the cone.

5. A motor housing assembly as described in claim 1, wherein the inlet port has a first cross-sectional area and the outlet port has a second cross-sectional area and the first and second cross-sectional areas are substantially equal.

6. A motor housing assembly as described in claim 1, wherein the outlet passageway comprises three different turns of at least ninety degrees each.

7. A motor housing assembly as described in claim 6, wherein the outlet passageway further comprises walls padded with a sound-absorbing material.

8. A motor housing assembly of claim 6, including a housing having the air outlet port and air inlet port and wherein the air outlet port and air inlet port have substantially the same cross-sectional area.

9. A motor housing assembly as described in claim 1, wherein the outlet passageway comprises a plurality of turns totaling at least 270° of direction change.

10. A motor housing assembly adapted to hold a motor wherein the motor comprises a fan adapted to cool the motor by drawing air across it, the assembly comprising:

an air inlet port, a shroud adapted to contain the motor within the housing, an air inlet passageway defining a path from the inlet port to the motor, an air outlet port, an air outlet passageway separated from the inlet passageway and defining a path from the motor to the outlet port, and a cone mounted in the outlet passageway and adjacent the fan, wherein the cone has a bullet shape comprising a circular base and a side wall, further wherein the side wall of the cone has a vertical cross-section with a convex curve, whereby air that is exhausted by the fan will flow in a laminar fashion around the cone and through the outlet passageway and outlet port.

11. A motor housing assembly as described in claim 10, wherein the outlet passageway comprises a plurality of turns totaling at least 270° of direction change.

* * * * *